(12) United States Patent
Ghassemi Hamadani et al.

(10) Patent No.: US 9,424,359 B1
(45) Date of Patent: Aug. 23, 2016

(54) TYPEAHEAD USING MESSAGES OF A MESSAGING PLATFORM

(71) Applicant: Twitter, Inc., San Francisco, CA (US)

(72) Inventors: Babak Ghassemi Hamadani, Sunnyvale, CA (US); Timothy Trueman, San Francisco, CA (US); Krishna Gade, Mountain View, CA (US); Yu-shuang Li, San Francisco, CA (US); Pankaj Gupta, San Francisco, CA (US); Pradhuman Jhala, Corte Madera, CA (US)

(73) Assignee: Twitter, Inc., San Francisco, CA (US)

( * ) Notice: Subject to any disclaimer, the term of this patent is extended or adjusted under 35 U.S.C. 154(b) by 80 days.

(21) Appl. No.: 14/217,318

(22) Filed: Mar. 17, 2014

Related U.S. Application Data

(60) Provisional application No. 61/800,762, filed on Mar. 15, 2013.

(51) Int. Cl.
*G06F 17/30* (2006.01)

(52) U.S. Cl.
CPC ..... *G06F 17/30867* (2013.01); *G06F 17/3048* (2013.01)

(58) Field of Classification Search
CPC .. G06Q 50/01; G06Q 30/02; G06Q 30/0241; G06Q 10/101; G06F 17/30528; G06F 17/30392; G06F 17/30867; G06F 17/3053; G06F 17/30554; G06F 17/3064; G06F 17/30958; G06F 17/30864; G06F 17/30979; G06F 17/2705; H04L 12/1813; H04L 51/32; H04L 67/22; H04L 65/403; H04W 4/206

USPC ....... 707/722, 769, 798, 723, 751, 767, 771, 707/748, 749, 755, 728, 772, 779; 705/319; 709/204
See application file for complete search history.

(56) References Cited

U.S. PATENT DOCUMENTS

| | | | | |
|---|---|---|---|---|
| 5,848,412 | A * | 12/1998 | Rowland | G06F 21/6209 |
| 6,985,933 | B1 * | 1/2006 | Singhal | G06F 17/3087 707/E17.11 |
| 8,185,558 | B1 * | 5/2012 | Narayanan et al. | 707/798 |
| 8,572,129 | B1 * | 10/2013 | Lee et al. | 707/798 |
| 8,601,019 | B1 * | 12/2013 | Weininger | G06F 17/3097 707/769 |
| 8,612,882 | B1 * | 12/2013 | Dontcheva et al. | 715/790 |
| 8,645,332 | B1 * | 2/2014 | Cohen et al. | 707/691 |
| 8,775,517 | B1 * | 7/2014 | Goldman et al. | 709/204 |
| 2003/0041147 | A1 * | 2/2003 | van den Oord et al. | 709/227 |
| 2006/0059434 | A1 * | 3/2006 | Boss et al. | 715/780 |
| 2006/0075120 | A1 * | 4/2006 | Smit | G06F 17/2288 709/227 |
| 2006/0168509 | A1 * | 7/2006 | Boss et al. | 715/507 |
| 2006/0242109 | A1 * | 10/2006 | Pereira et al. | 707/1 |
| 2008/0209338 | A1 * | 8/2008 | Li | 715/745 |
| 2008/0320411 | A1 * | 12/2008 | Chen et al. | 715/780 |
| 2009/0037527 | A1 * | 2/2009 | Hodges et al. | 709/203 |
| 2009/0271700 | A1 * | 10/2009 | Chen | G06F 17/276 715/261 |

(Continued)

OTHER PUBLICATIONS

Tom Hamshere, "Typeahead and people search," Dec. 19, 2012.*

*Primary Examiner* — Alina N Boutah

(57) ABSTRACT

A method and system for facilitating typeahead. The method can include: identifying a set of topics and/or connected accounts; storing, based on one or more signals associated with a user account, a portion of the topics and/or connected accounts in a cache; and using the cache to provide typeahead suggestions to a client in response to a request associated with the user account.

20 Claims, 9 Drawing Sheets

(56) References Cited

U.S. PATENT DOCUMENTS

| | | | |
|---|---|---|---|
| 2009/0300491 A1* | 12/2009 | Wasmund | 715/700 |
| 2010/0017753 A1* | 1/2010 | Li et al. | 715/810 |
| 2010/0318538 A1* | 12/2010 | Wyman et al. | 707/759 |
| 2011/0173174 A1* | 7/2011 | Flitcroft | 707/707 |
| 2011/0264681 A1* | 10/2011 | Kimberlin | G06F 17/30976 707/767 |
| 2012/0150979 A1* | 6/2012 | Monaco | 709/206 |
| 2012/0311419 A1* | 12/2012 | Kwak | H04L 67/02 715/205 |
| 2012/0317097 A1* | 12/2012 | Tseng | 707/722 |
| 2013/0054632 A1* | 2/2013 | van Dijk | G06F 17/3097 707/767 |
| 2013/0124542 A1* | 5/2013 | Lee et al. | 707/751 |
| 2013/0282844 A1* | 10/2013 | Logan et al. | 709/206 |
| 2014/0095419 A1* | 4/2014 | Gandhi et al. | 706/46 |
| 2014/0156744 A1* | 6/2014 | Hua et al. | 709/204 |
| 2014/0157145 A1* | 6/2014 | Bush et al. | 715/745 |
| 2014/0172565 A1* | 6/2014 | Alon et al. | 705/14.54 |
| 2014/0244619 A1* | 8/2014 | Doroshenko | 707/722 |
| 2015/0039582 A1* | 2/2015 | Liutikas | G06F 17/30867 707/706 |
| 2016/0070790 A1* | 3/2016 | Bhat | G06F 17/30864 707/722 |

* cited by examiner

TYPEAHEAD USING MESSAGES OF A MESSAGING PLATFORM

CROSS-REFERENCE TO RELATED APPLICATION

This application claims the benefit of U.S. Provisional Patent Application Ser. No. 61/800,762, filed on Mar. 15, 2013, and entitled "Typeahead Using Messages of a Messaging Platform.," U.S. Provisional Patent Application Ser. No. 61/800,762 is incorporated by reference herein in its entirety.

BACKGROUND

Traditionally, typeahead is a technique for identifying suggestions for completing a term as the user types the term into a search box. Most implementations of typeahead involve sequentially sending each character entered by a user from a client to a server component for analysis. Based on the analysis, the server provides suggestions to the client, which are then displayed to the user. Typeahead suggestions can help to speed up the process of searching, avoid potential misspellings and/or typographical errors, and assist the user in recalling information based on partial or incomplete search terms.

Despite these benefits, typeahead analysis can be computationally expensive and prohibitively slow in certain applications. Furthermore, one of the most important aspects of typeahead functionality can be the relevancy of the provided suggestions. Irrelevant or uninteresting typeahead suggestions can actually be a burden to users, and can result in a difficult and distracting user experience.

SUMMARY

In general, in one aspect, the invention relates to a method for facilitating typeahead. The method includes: identifying a user account of a messaging platform; identifying a predefined degree of separation value; identifying, by a computer processor, connected accounts within the predefined degree of separation value of the user account; selecting, by the computer processor, a subset of the connected accounts for inclusion in a cache, wherein selecting the subset of the connected accounts is based at least on a graph relationship signal of each of the subset of the connected accounts; receiving a first character entered by a user after the subset of the connected accounts are stored in the cache; accessing the subset of the connected accounts in the cache; and matching the first character to matching accounts among the subset of the connected accounts, wherein the matching accounts are displayed as typeahead suggestions in a user interface of a client.

In general, in one aspect, the invention relates to a method for facilitating typeahead. The method includes: identifying a user account of a messaging platform; identifying, by a computer processor, a set of trending topics of the messaging platform; designating, by the computer processor and based at least on a signal associated with the user account, a subset of the trending topics as personalized topics, wherein the personalized topics are stored in a cache; receiving a first character entered by a user after the personalized topics are stored in the cache; accessing the subset of the connected accounts in the cache; and matching the first character to matching topics among the personalized topics, wherein the matching topics are displayed as typeahead suggestions in a user interface of a client.

In general, in one aspect, the invention relates to a method for facilitating typeahead. The method includes: receiving, by a computer processor, a character entered by a user; obtaining, by the computer processor and based on the character, a set of matching personalized topics from a cache; obtaining, by the computer processor and based on the character, a set of matching accounts from the cache; and displaying, by the computer processor and in a user interface, at least a portion of the set of matching personalized topics in conjunction with at least a portion of the set of matching accounts as typeahead suggestions.

In general, in one aspect, the invention relates to a system for facilitating typeahead. The system includes: a computer processor; a typeahead analysis module executing on the computer processor and configured to identify a user account of a messaging platform, identify a predefined degree of separation value, identify connected accounts within the predefined degree of separation value of the user account, and select a subset of the connected accounts for inclusion in a cache, wherein selecting the subset of the connected accounts is based at least on a graph relationship signal of each of the subset of the connected accounts; and a typeahead runtime engine configured to receive a first character entered by a user after the subset of the connected accounts are stored in the cache, access the subset of the connected accounts in the cache, and match the first character to matching accounts among the subset of the connected accounts, wherein the matching accounts are displayed as typeahead suggestions in a user interface of a client.

In general, in one aspect, the invention relates to a system for facilitating typeahead. The system includes: a computer processor; a typeahead analysis module executing on the computer processor and configured to identify a user account of a messaging platform, identify a set of trending topics of the messaging platform, and designate, based at least on a signal associated with the user account, a subset of the trending topics as personalized topics, wherein the personalized topics are stored in a cache; and a typeahead runtime engine configured to receive a first character entered by a user after the personalized topics are stored in the cache, access the subset of the connected accounts in the cache, and match the first character to matching topics among the personalized topics, wherein the matching topics are displayed as typeahead suggestions in a user interface of a client.

In general, in one aspect, the invention relates to a client system for facilitating typeahead. The client system includes: a display screen; a computer processor; and a client typeahead module executing on the computer processor and configured to receive a character entered by a user, obtain, based on the character, a set of matching personalized topics from a cache, obtain, based on the character, a set of matching accounts from the cache, and display, in a user interface, at least a portion of the set of matching personalized topics in conjunction with at least a portion of the set of matching accounts as typeahead suggestions.

In general, in one aspect, the invention relates to a non-transitory computer-readable storage medium including instructions for facilitating typeahead. The instructions, when executing on at least one computer processor, enable the computer processor to: identify a user account of a messaging platform; identify a predefined degree of separation value; identify connected accounts within the predefined degree of separation value of the user account; select a subset of the connected accounts for inclusion in a cache, wherein selecting the subset of the connected accounts is based at least on a graph relationship signal of each of the subset of the connected accounts; receive a first character entered by a user after the subset of the connected accounts are stored in the cache; access the subset of the connected accounts in the cache; and match the first character to matching accounts among the subset of the connected accounts, wherein the matching accounts are displayed as typeahead suggestions in a user interface of a client.

In general, in one aspect, the invention relates to a non-transitory computer-readable storage medium including instructions for facilitating typeahead. The instructions, when executing on at least one computer processor, enable the computer processor to: identify a user account of a messaging platform; identify a set of trending topics of the messaging platform; designate, based at least on a signal associated with the user account, a subset of the trending topics as personalized topics, wherein the personalized topics are stored in a cache; receive a first character entered by a user after the personalized topics are stored in the cache; access the subset of the connected accounts in the cache; and match the first character to matching topics among the personalized topics, wherein the matching topics are displayed as typeahead suggestions in a user interface of a client.

In general, in one aspect, the invention relates to a non-transitory computer-readable storage medium including instructions for facilitating typeahead. The instructions, when executing on at least one computer processor, enable the computer processor to: receive a character entered by a user; obtain, based on the character, a set of matching personalized topics from a cache; obtain, based on the character, a set of matching accounts from the cache; and display, in a user interface, at least a portion of the set of matching personalized topics in conjunction with at least a portion of the set of matching accounts as typeahead suggestions.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
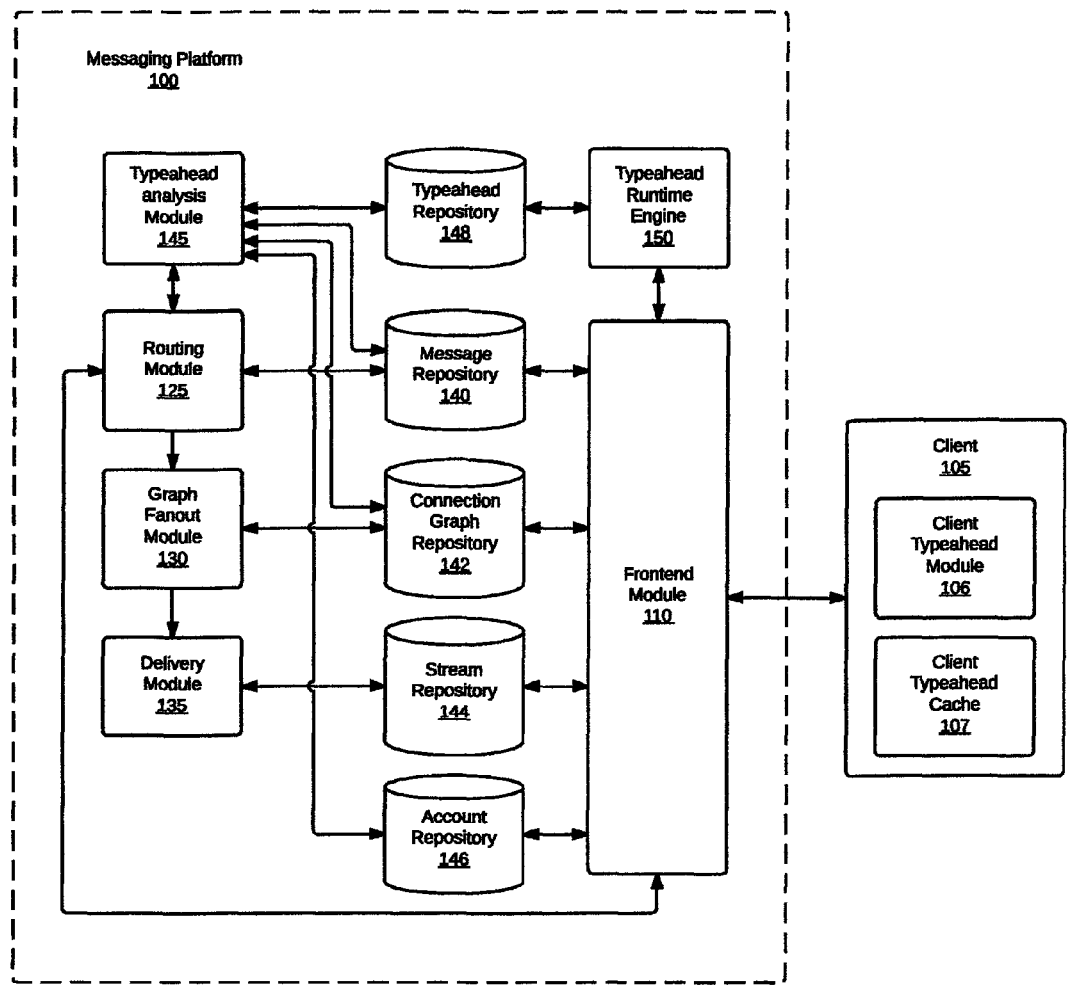
FIG. 1 shows a schematic diagram of a system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for facilitating typeahead. Initially, a set of topics and/or connected accounts is identified. Based on one or more signals associated with a user account, a portion of the topics and/or connected accounts is stored in a cache. The cache is then used to provide typeahead suggestions to a client in response to a request associated with the user account.

FIG. 1 shows a messaging platform (100) and a client (105) in accordance with one or more embodiments of the invention. As shown in FIG. 1, the messaging platform (100) has multiple components including a typeahead runtime engine (150), an typeahead analysis module (145), a typeahead repository (148), a frontend module (110), a routing module (125), a graph fanout module (130), a delivery module (135), a message repository (140), a connection graph repository (142), a stream repository (144), and an account repository (146). As also shown in FIG. 1, the client (105) has multiple components including a client typeahead module (106) and a client typeahead cache (107). Various components of the messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments of the invention, the messaging platform (100) is a platform for facilitating real-time communication between one or more entities. For example, the messaging platform (100) may store millions of accounts of individuals, businesses, and/or other entities (e.g., pseudonym accounts, novelty accounts, etc.). One or more users of each account may use the messaging platform (100) to send messages to other accounts inside and/or outside of the messaging platform (100). The messaging platform (100) may be configured to enable users to communicate in "real-time", i.e., to converse with other users with a minimal delay and to conduct a conversation with one or more other users during simultaneous sessions. In other words, the messaging platform (100) may allow a user to broadcast messages and may display the messages to one or more other users within a reasonable time frame so as to facilitate a live conversation between the users. Recipients of a message may have a predefined graph relationship with an account of the user broadcasting the message. In one or more embodiments of the invention, the user is not an account holder or is not logged in to an account of the messaging platform (100). In this case, the messaging platform (100) may be configured to allow the user to broadcast messages and/or to utilize other functionality of the messaging platform 100 by associating the user with a temporary account or identifier.

In one or more embodiments of the invention, the typeahead analysis module (145) includes functionality to identify a user account of a messaging platform. The user account can be any account having connections (e.g., bidirectional connections, unidirectional connections, etc.) with one or more other accounts of the messaging platform (100) in a connection graph.

Figure 2:
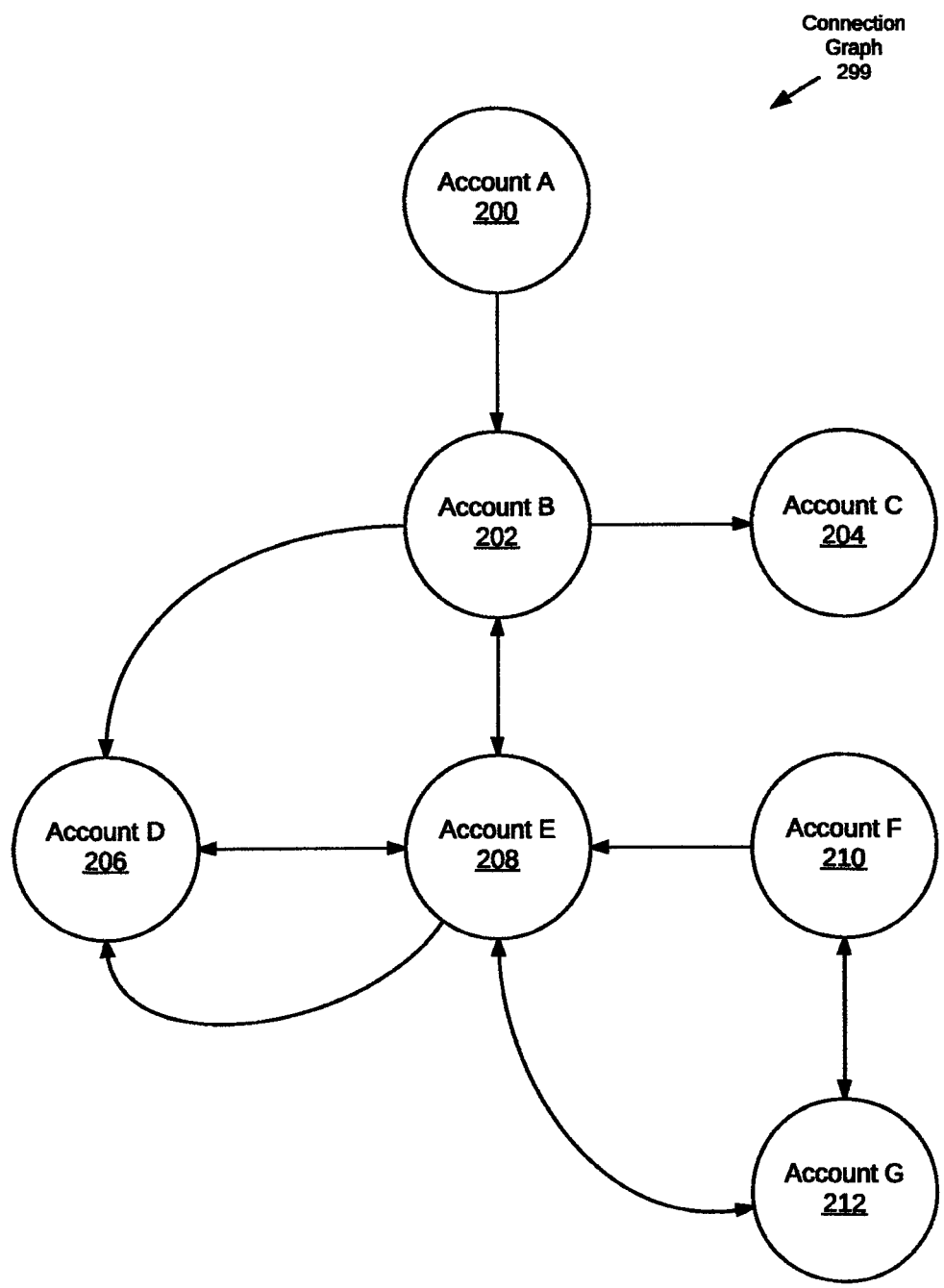
FIG. 2 shows an example depiction of a connection graph, in accordance with one or more embodiments of the invention.

In one or more embodiments of the invention, the connection graph repository (142) is configured to store one or more connection graphs. FIG. 2 shows an example depiction of a connection graph (299) in accordance with one or more embodiments of the invention. As shown in FIG. 2, the connection graph (299) has multiple components including nodes representing accounts of the messaging platform (100) (i.e., Account A (200), Account B (202), Account C (204), Account D (206), Account E (208), Account F (210), Account G (212)) and edges connecting the various nodes.

The connection graph (299) is a data structure representing relationships (i.e., connections) between one or more accounts. The connection graph (299) represents accounts as nodes and relationships as edges connecting one or more nodes. A relationship may refer to any association between the accounts (e.g., following, friending, subscribing, tracking, liking, tagging, and/or etc.). The edges of the connection graph (299) may be directed and/or undirected based on the type of relationship, in accordance with various embodiments of the invention. For purposes of this disclosure a connected account is any account that is connected (either directly or indirectly) to another account in a conversation graph. Thus, all accounts within a common conversation graph are connected accounts. Accounts that are within 1 degree of separation can be referred to as directly connected accounts. Accounts that are within greater than 1 degree of separation can be referred to as indirectly connected accounts.

Returning to FIG. 1, in one or more embodiments of the invention, the typeahead analysis module (145) includes functionality to identify a predefined degree of separation value. A degree of separation between two accounts is a number of edges in a shortest distance between the two accounts in a connection graph. Thus, in the connection graph (299) of FIG. 2, account A (200) and account C (204) have a degree of separation equal to two. In another example, account D (206) and account B (202) have a degree of separation equal to one. The predefined degree of separation value can be an integer greater than zero which is used by the typeahead analysis module (145) to identify connected accounts that are within or at a predefined degree of separation from a context account.

In one or more embodiments of the invention, the typeahead analysis module (145) includes functionality to identify connected accounts within the predefined degree of separation value of the user account. Thus, for example, the typeahead analysis module (145) can identify a user account associated with a typeahead request. In this example, given a predefined degree of separation value of two, the typeahead analysis module (145) then identifies all accounts within two degrees of separation of the user account. In one or more embodiments, the predefined degree of separation value can correspond to a specific type of graph connection (e.g., subscriber, friend, fan, follower, followee, etc.). Thus, for example, the typeahead analysis module (145) can be configured to identify only accounts followed by the user account and not followers of the user account. In another example, the typeahead analysis module (145) can be configured to identify only friend accounts of the user account and to exclude accounts that are fans or subscribers to the user account. In one or more of the embodiments discussed in the present disclosure, any set of accounts can be substituted in place of or in addition to the set of connected accounts. For example, a separate set of high credibility or highly connected accounts (even if outside of the predefined degree of separation value) can be added to the set of connected accounts based on one or more other signals.

In one or more embodiments of the invention, the typeahead analysis module (145) includes functionality to select a subset of the identified connected accounts for inclusion in a cache (e.g., client typeahead cache (107)), based at least on a graph relationship signal of the subset of the connected accounts. The typeahead analysis module (145) can be configured to provide identifiers and data associated with the subset of the identified connected accounts to the client (105) either periodically (e.g., daily) or on-demand, in accordance with various embodiments of the invention. For example, the typeahead analysis module (145) may select a top ranking 4000 accounts for inclusion in the cache.

In one or more embodiments of the invention, a signal is any input to a scoring algorithm for topics and/or accounts. For example, a graph relationship signal can be a numerical representation of an attribute associated with connections in a connection graph. Examples of a graph relationship signal can include, but are not limited to, number of connections (e.g., followers, followees, friends, subscribers, subscribees (subscribed to accounts), etc.), number of interactions with other accounts per predefined time period, connection velocity (e.g., a rate at which an account adds connections per time period), degrees of separation from a context account (e.g., a requesting account of the typeahead request). Other examples of signals used by a scoring algorithm can include, but are not limited to, a binary value indicating whether an account is verified, a credibility rating of an account, a binary value indicating whether an account is flagged as spam, a value representing a geographic proximity of a message/account to a requesting device/user (e.g., the value can be determined based on geotagged content and/or global positioning system coordinates of a mobile device), interest topics associated with an account, topics associated with a message, degree of separation, trending topics, promoted accounts/messages, a binary value indicating whether an account is designated as a trending account (e.g., an account exceeding a threshold rate of increase in mentions by other accounts), an engagement value indicating a level of engagement with messages of an account (e.g., average clicks per message, average views per message), and etc.

In one example, the typeahead analysis module (145) scores each of the connected accounts using the following formula, or a variant thereof:

$Scn = Acn + Bcn + Cn + Dn$, where Scn is a score of connected account n relative to context account c, where Acn is a number of common connections between account n and the context account c, where B is a number of interactions between account n and the context account, where Cn is a credibility rating of account n, and where Dn is an average number of messages posted daily by account n over the past month. In one or more embodiments, the one or more of the signals (e.g., represented by Can, Bcn, Cn, and Dn, above) can be weighted by a predefined weight value to increase or decrease the relative importance of the signal in calculating the score. Thus, in this example, the typeahead analysis module (145) selects a highest scoring set of the connected accounts for inclusion in the client typeahead cache (107).

In one or more embodiments of the invention, the typeahead analysis module (145) includes functionality to identify a token set for each of a predefined number of the top ranked connected accounts (e.g., accounts with the highest scores). In one or more embodiments, the typeahead analysis module (145) is configured to submit a display name, username, and/or other searchable attribute of each account to a tokenization module (not shown) in conjunction with a request for a token set. The typeahead analysis module (145) can then receive a separate token set for each of the accounts and/or account attributes (e.g., display name). A token set is a set of tokens (phrases, terms, strings, or other groupings of one or more characters/words) relevant to a particular account or attribute of an account. Thus, for example, the token set can include common misspellings of the account name, synonyms of words identified in a display name, expanded text corresponding to an acronym, a synonym of a topic or portion of a topic, a common nickname associated with a display name, alternate spellings of a topic, semantically equivalent or highly similar text corresponding to a name or topic, and/or any other text which can be used to provide typeahead suggestions for a given account or topic. For example, the token set selected for the name "Christina" may be {"Christy", "Kristina", "Cristina", "Christine", "Tina"}. The display name, username, token sets, and/or other searchable text associated with an account can be referred to as text attributes of the account.

In one or more embodiments of the invention, the typeahead analysis module (145) includes functionality to send the text attributes and identifiers of the predefined number of the top ranked connected accounts to the client (105) for storage in the client typeahead cache (107). The client typeahead module (106) can be configured to receive the text attributes and identifiers and to store them in the client typeahead cache (107). Thus, in one example, a display name, numerical identifier, username, and token set can be stored in the client typeahead cache (107) for each of the top ranked connected accounts.

In one or more embodiments of the invention, the client typeahead module (106) includes functionality to identify one or more characters entered by a user into a user interface of the client (105). The characters can be typed by a user into a search box of a user interface of a messaging application executing on the client (105), for example. In response to receiving each character, the client typeahead module (106) can be configured to search the client typeahead cache (107) in order to provide one or more typeahead suggestions. Thus, any modification to text in the search box can trigger a new typeahead search and a new set of typeahead suggestions to be displayed.

In one or more embodiments of the invention, the client typeahead module (106) includes functionality to match the characters to one or more of the connected accounts in the client typeahead cache (107). Matching the characters to the connected accounts may involve searching the text attribute(s) of each connected account and comparing the text attribute(s) to the characters entered by the user. For example, if a user enters the text "Je", the client typeahead module (106) may match the characters to the text attributes "Jenn Smith", "Jean Edwards", and "@JerrySeinfeld" associated with different connected accounts. In one or more embodiments of the invention, the matching of characters to an account can be performed based on matching the characters to a display name of the account, a username of the account, a nickname of the account, a token of a token set, and/or any other text attribute of the account. Depending on the search algorithm used, the matching can be done based on a simple character-by-character match or can include a fuzzy match based on more complicated analysis.

In one or more embodiments of the invention, the client typeahead module (106) includes functionality to determine whether a predefined number of matching accounts have been identified in the client typeahead cache (107). The predefined number can be any arbitrarily defined number of accounts (e.g., 10).

In one or more embodiments of the invention, in response to determining that a predefined number of matching accounts is not identified in the client typeahead cache (107), the typeahead runtime engine (150) includes functionality to perform a broader search to identify additional matching accounts. The client typeahead module (106) may be configured to send a request for the broader search to the typeahead runtime engine (150). The client typeahead module (106) may further be configured to send the text entered by the user to the typeahead runtime engine (150) in conjunction with the request. The typeahead runtime engine (150) can then be configured to select a broader set of candidate accounts for typeahead analysis. The typeahead runtime engine (150) can perform a matching of the user-entered text to a predefined number of accounts from the broader set of candidate accounts and then send the matching accounts to the client (105) in response to the request.

In one or more embodiments of the invention, the typeahead runtime engine (150) includes functionality to use a different set of signals for identifying the broader set of candidate accounts. For example, the typeahead runtime engine (150) can be configured to user a larger predefined degree of separation value in order to identify a larger set of accounts. In another example, the search for the broader set of candidate accounts can depend upon a binary value indicating whether each account is verified (e.g., verified to belong to a celebrity or other person likely to be impersonated), a binary value indicating whether an account is a trending account, and/or any other signals. In one or more embodiments of the invention, the search for the broader set of candidate topics involves using the same multi-signal search algorithm and the same signals, but selecting a larger number of candidate accounts for comparison to the user-entered text (e.g., based on the score calculated for each connected account). For the broader search, in one or more embodiments, the typeahead runtime engine (150) may be configured to use signals which do not depend upon a graph relationship between the candidate account and the user account.

In one or more embodiments of the invention, the client typeahead module (106) includes functionality to identify one or more matching accounts without receiving user-entered characters. Thus, for example, the typeahead analysis module (145) can be configured to send a default score with each of the connected accounts to the client (105). In this example, the default score is the score used to rank the connected accounts when selecting accounts for inclusion in the client typeahead cache (107). In response to receiving a user input, the client typeahead module (106) can be configured to provide a set of highest scoring connected accounts (i.e., accounts with the highest default scores) of the client typeahead cache (107) to be displayed as typeahead suggestions. Examples of the user input can include, but are not limited to, a user selection of a search text box, change of focus to a text box, selection of a drop-down menu, and any other trigger for displaying typeahead suggestions.

In one or more embodiments of the invention, the client (105) includes functionality to display the matching accounts as typeahead suggestions in a user interface. The matching accounts can be displayed using any visual representation, including one or more of the text attributes of the account, an avatar, an image, and/or any other associated visual elements, in accordance with various embodiments.

In one or more embodiments of the invention, the typeahead analysis module (145) includes functionality to identify a set of trending topics of the messaging platform (100). For purposes of this disclosure, a topic can be any term, token, phrase, and/or other collection of characters. For example, the messaging platform (100) can be configured to identify trending topics by comparing a set of topics identified within messages to an expected frequency of the topic. Thus, the current rate at which a topic has occurred in messages (e.g., within the last hour) can be compared to an expected rate of occurrence of the topic. The comparison can be performed using a linguistic or historical analysis of messages, and the topics with the greatest increase between the expected rate of occurrence and the current rate of occurrence can be designated as trending topics. Any other method of designating trending topics can be used, in accordance with various embodiments. In one or more of the embodiments discussed in the present disclosure, any set of topics can be substituted in place of or in addition to the set of trending topics. For example, rather than identifying trending topics, a predefined list of topics, a set of topics associated with a user account, and/or a set of topics preselected by a user can be used.

In one or more embodiments of the invention, the typeahead analysis module (145) includes functionality to designate, based at least on a signal associated with the user account, a subset of the trending topics as personalized topics. One example of a signal used to designate personalized topics is a language of the context account. A numerical representation of the language can be used as an input to a scoring algorithm used to rank the topics, for example. The language of the context account can be identified in account preferences of the account and/or based on a most commonly used language of messages posted by the account. Other examples of signals that can optionally be used to designate personalized topics include (in addition those described above with regard to identifying connected accounts) interest categories associated with the context account, topics searched for by the context account, a current time of day (e.g., certain topics are more applicable depending on time, such as stock symbols being shown while the stock market is open/trading), events attended by a user of the user account, and etc. The typeahead analysis module (145) can be configured to provide the personalized topics to the client (105) either periodically (e.g., daily) or on-demand, in accordance with various embodiments of the invention.

In one example, the typeahead analysis module (145) scores each of the trending topics using the following formula, or a variant thereof:

$Sc=An+Bnc+Cnc$, where Sn is a score of trending topic n, where An is a trend index indicating a difference between a current number of occurrences of trending topic n vs the expected number of occurrences of trending topic n, where Bnc is an interest similarity index between the trending topic n and interested topics of the context account c, and where Cnc is a search similarity index between the trending topic n and a set of previously searched topics of the context account c. In one or more embodiments, the one or more of the signals (e.g., represented by An, Bnc, and Cnc, above) can be weighted by a predefined weight value to increase or decrease the relative importance of the signal in calculating the score. Thus, in this example, the typeahead analysis module (145) designates a highest scoring set of the trending topics as personalized topics. The typeahead analysis module (145) can provide the personalized topics to the client (105) for inclusion in the client typeahead cache (107).

In one or more embodiments of the invention, the typeahead analysis module (145) includes functionality to identify a token set for each of a predefined number of the personalized topics (e.g., topics with the highest scores). In one or more embodiments, the typeahead analysis module (145) is configured to submit each of the personalized topics to a tokenization module (not shown) in conjunction with a request for a token set. The typeahead analysis module (145) can then receive a separate token set for each of the personalized topics. For example, the token set selected for the topic "Twitter" may be {"Twttr", "Tweet", "Twiter", "Twtter"}. In another example, a topic including a stock symbol (e.g., identified by a "$" character) is assigned a token set including a company name corresponding to the stock symbol. Thus, for example, the ticker symbol included in the topic "$BAC" can be assigned a token set including the token "Bank of America". The topic and token sets can collectively be referred to as text attributes of the topic.

In one or more embodiments of the invention, the typeahead analysis module (145) includes functionality to send the predefined number of the personalized topics and/or their corresponding token sets to the client (105). The client typeahead module (106) can be configured to receive the personalized topics and token sets and to store them in the client typeahead cache (107).

In one or more embodiments of the invention, the client typeahead module (106) includes functionality to match the user entered characters to one or more of the personalized topics in the client typeahead cache (107) in response to a request (e.g., from the client (105)). Matching the characters to the topics may involve searching the personalized topics in the client typeahead cache (107) and comparing them to the characters entered by the user. For example, if a user enters the text "fo", the client typeahead module (106) may match the characters to the topics and/or tokens "football", "food network", and "$FOE". Depending on the search algorithm used, the matching can be done based on a simple character-by-character match or can include a fuzzy match based on more complicated analysis.

In one or more embodiments of the invention, the client typeahead module (106) includes functionality to determine whether a predefined number of topics have been matched? The predefined number can be any arbitrarily defined number of accounts (e.g., 10).

In one or more embodiments of the invention, in response to determining that a predefined number of matching topics is not identified in the client typeahead cache (107), the client typeahead runtime engine (150) includes functionality to perform a broader search to identify additional matching topics. The client typeahead module (106) may be configured to send a request for the broader search to the typeahead runtime engine (150). The client typeahead module (106) may further be configured to send the text entered by the user to the typeahead runtime engine (150) in conjunction with the request. The typeahead runtime engine (150) can be configured to select a broader set of candidate topics for typeahead analysis. The typeahead runtime engine (150) can then perform a matching of the user-entered text to a predefined number of topics from the broader set of candidate topics and then send the matching topics to the client (105) in response to the request.

In one or more embodiments of the invention, the typeahead runtime engine (150) includes functionality to use a different set of signals for identifying the broader set of candidate accounts. For example, the typeahead runtime engine (150) may use a broader signal for calculating trending topics. In this way, the broader signal may require a lower number of occurrences of a topic to be identified within messages of the messaging platform (100) in order for the topic to be designated as a trending topic. In another example, the typeahead runtime engine (150) can be configured to user a larger proximity value to match identify a larger set of trending topics in geographic proximity to the client (105). In yet another example, the search for the broader set of candidate topics can involve using the same multi-signal search algorithm and the same signals, but selecting a larger number of candidate topics for comparison to the user-entered text (e.g., based on the score calculated for each topic). For the broader search, in one or more embodiments, the typeahead runtime engine (150) may be configured to use signals which do not depend upon attributes of a requesting user account.

In one or more embodiments of the invention, the client typeahead module (106) includes functionality to identify one or more matching topics without receiving user-entered characters. Thus, for example, the typeahead analysis module (145) can be configured to send a default score with each of the personalized topics to the client (105). In this example, the default score is the score used to rank the personalized topics when selecting trending topics for inclusion in the client typeahead cache (107). In response to receiving a user input, the client typeahead module (106) can be configured to provide a set of highest scoring personalized topics (i.e., topics with the highest default scores) of the client typeahead cache (107) to be displayed as typeahead suggestions. Examples of the user input can include, but are not limited to, a user selection of a search text box, change of focus to a text box, selection of a drop-down menu, and any other trigger for displaying typeahead suggestions.

In one or more embodiments of the invention, the client (105) includes functionality to display the matching topics as typeahead suggestions in a user interface. The matching personalized topics can be displayed using any visual representation, including using text highlighting to highlight one or more matching characters in the personalized topic, in accordance with various embodiments.

In one or more embodiments of the invention, the client typeahead module (106) includes functionality to identify both matching topics and matching accounts in response to user-entered text. The client typeahead module (106) can be configured to obtain scores for each of the matching topics and the matching accounts, and to rank them in a single list according to their scores. In this way, the client typeahead module (106) can provide a ranked list of typeahead suggestions containing both topics and account identifiers for display in a user interface.

In one or more embodiments of the invention, the client (105) includes functionality to display, in a user interface, at least a portion of the matching topics in conjunction with at least a portion of the matching accounts. For example, the client (105) can be configured to display the matching topics and representations of the matching accounts in the order defined in a single ranked list. In another example, the client (105) can display one or more matching topics in a first list and one or more matching accounts in a second list, where the first list is displayed above, below, to the left of, or to the right of the second list.

In one or more embodiments of the invention, the client typeahead cache (107) can be substituted by the typeahead repository (148). In this way, personalized topics and connected accounts can be stored server side and/or made available for query-dependent processing by the typeahead runtime engine (150).

In one or more embodiments of the invention, the functionality of the client typeahead module (106) can be performed instead by the typeahead runtime engine (150). Thus, the client-side processing of searching and matching topics and accounts can be performed server side.

In one or more embodiments of the invention, the typeahead analysis module (145) is a software application or a set of related software applications configured to execute on one or more hardware processors. The typeahead analysis module (145) can include one or more reader threads configured to perform multiple concurrent searches/analysis of messages of the messaging platform (100). The typeahead analysis module (145) can be a component of a service-oriented architecture (SOA) or any other software platform, either inside or outside of the messaging platform (100), in accordance with various embodiments. In one or more embodiments of the invention, one or more components of the typeahead analysis module (145) reside in a cloud computing application in a network distributed system. In one or more embodiments of the invention, typeahead analysis module (145) is integrated within or operatively connected to one or more other components of the messaging platform (100).

In one or more embodiments of the invention, the typeahead runtime engine (150) is a software application or a set of related software applications configured to execute on one or more hardware processors. The typeahead runtime engine (150) can include one or more reader threads configured to perform multiple concurrent searches/analysis of data in the typeahead repository (148). The typeahead runtime engine (150) can be a component of a service-oriented architecture (SOA) or any other software platform, either inside or outside of the messaging platform (100), in accordance with various embodiments. In one or more embodiments of the invention, one or more components of the typeahead runtime engine (150) reside in a cloud computing application in a network distributed system. In one or more embodiments of the invention, typeahead runtime engine (150) is integrated within or operatively connected to one or more other components of the messaging platform (100).

In one or more embodiments of the invention, the routing module (125) includes functionality to receive one or more messages and to store the messages in the message repository (140). The routing module (125) can be configured to assign an identifier to the message and to notify the graph fanout module (130) of a sender of the message.

In one or more embodiments of the invention, the graph fanout module (130) includes functionality to retrieve graph data from the connection graph repository (142) and to use the graph data to determine which accounts in the messaging platform (100) should receive the message. The graph data, for example, can reflect which accounts in the messaging platform are "following" a particular account and are, therefore, subscribed to receive status messages from the particular account.

In one or more embodiments of the invention, the delivery module (135) includes functionality to receive a list of accounts from the graph fanout module (130) and the message identifier generated by the routing module (125) and to insert the message identifier into stream data associated with each identified account. The delivery module (135) can then store the message list in the stream repository (144). The stream data stored in the stream repository (144) can make up one or more streams associated with one or more accounts of the messaging platform (100). A stream may be a dynamic list of messages associated with one or more accounts or can reflect any arbitrary organization of messages that is advantageous for the user of an account.

In one or more embodiments of the invention, the frontend module (110) is a software application or a set of related software applications configured to communicate with external entities (e.g., client (105)). The frontend module (110)

can include the application programming interface (API) and/or any number of other components used for communicating with entities outside of the messaging platform (100). The API can include any number of specifications for making requests from and/or providing data to the messaging platform (100). For example, a function provided by the API can provide typeahead suggestions to a requesting client (105).

In one or more embodiments of the invention, the frontend module (110) is configured to use one or more of the data repositories (message repository (140), connection graph repository (142), stream repository (144), account repository (145), and typeahead repository (148)) to define streams for serving messages (i.e., stream data) to a user of the account on the messaging platform (100). A user can use any client (105) to receive the messages. For example, where the user uses a web-based client to access the messaging platform (100), an API of the frontend module (110) can be utilized to define one or more streams and/or to serve the stream data to the client for presentation to the user. Similarly, different forms of message delivery can be handled by different modules in the frontend module (110). In one or more embodiments of the invention, the user can specify particular receipt preferences which are implemented by the frontend module (110).

In one or more embodiments of the invention, the typeahead repository (148) is configured to store a cache of personalized topics and/or connected accounts for a set of accounts of the messaging platform (100). The typeahead repository (148) can be configured to store a larger set of personalized topics and/or accounts than the client typeahead cache (107), or can be used as a substitute for the client typeahead cache (107) in embodiments of the invention where the search and matching functionality of the client typeahead module (106) is performed by the typeahead runtime engine (150).

In one or more embodiments of the invention, one or more of the data repositories (message repository (140), connection graph repository (142), stream repository (144), account repository (146), and typeahead repository (148)) is a database and/or storage service residing on one or more servers. For example, one or more of the data repositories may be implemented as a storage service using service-oriented architecture (SOA) and configured to receive requests for data and to provide requested data to other components of the messaging platform (100). In another example, the message repository (140) can include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, one or more of the data repositories (message repository (140), connection graph repository (142), stream repository (144), account repository (146), and typeahead repository (148)) is a separate application or set of applications residing on one or more servers external (and communicatively coupled) to the messaging platform (100). Alternatively, in one or more embodiments of the invention, one or more of the data repositories can be an integrated component of the messaging platform (100) and/or can reside, either partially or entirely, on one or more common hardware devices (e.g., a server).

FIGS. 3A, 3B, 4A, 4B, and 5 show flowcharts of methods, in accordance with various embodiments of the invention. While the various steps in these flowcharts are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIGS. 3A, 3B, 4A, 4B, and 5 should not be construed as limiting the scope of the invention.

Figure 3A:
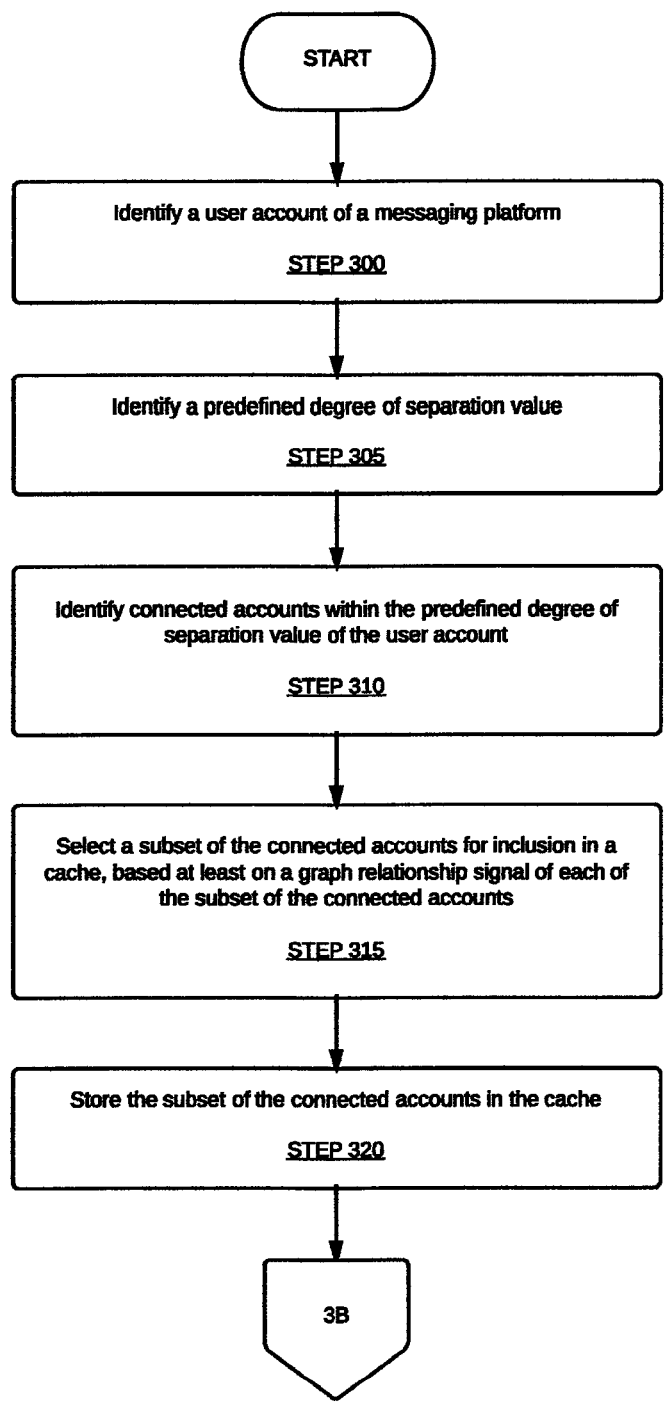
FIGS. 3A, 3B, 4A, 4B, and 5 show flowcharts, in accordance with one or more embodiments of the invention.
Figure 4A:
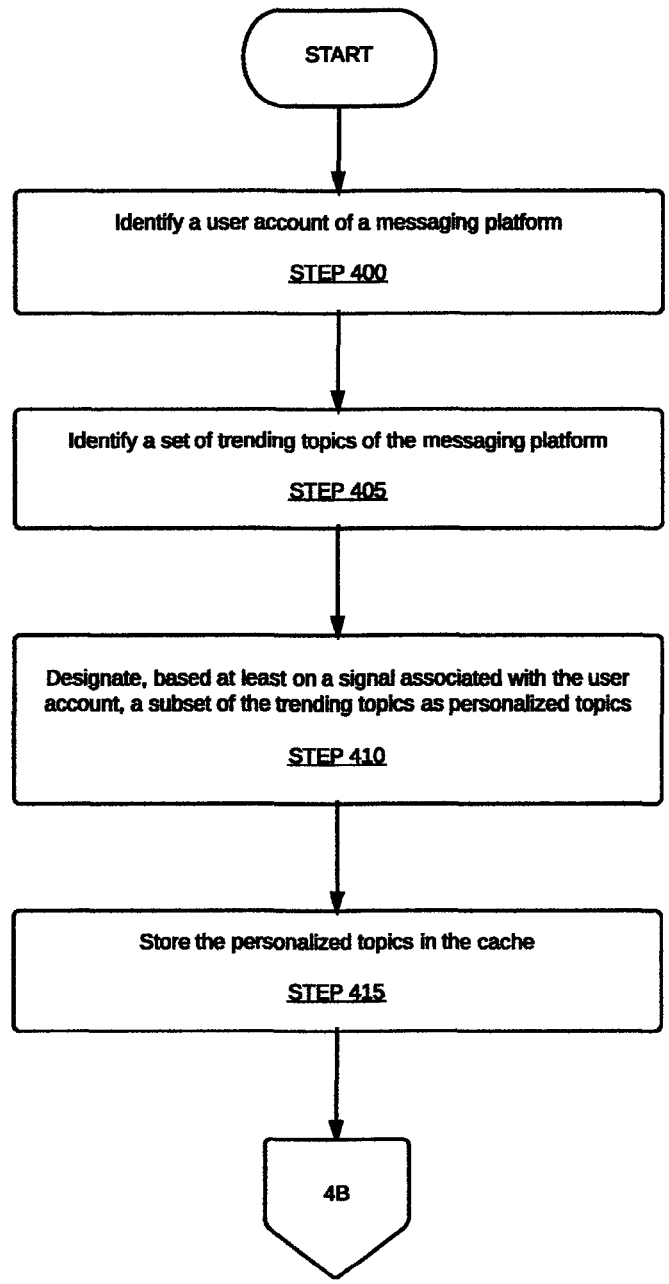

The steps of FIGS. 3A and 4A can be performed to store connected accounts in a cache. The steps of FIGS. 3A and 4A performed, for example, by a typeahead analysis module (e.g., typeahead analysis module (145) of FIG. 1, discussed above).

Figure 3B:
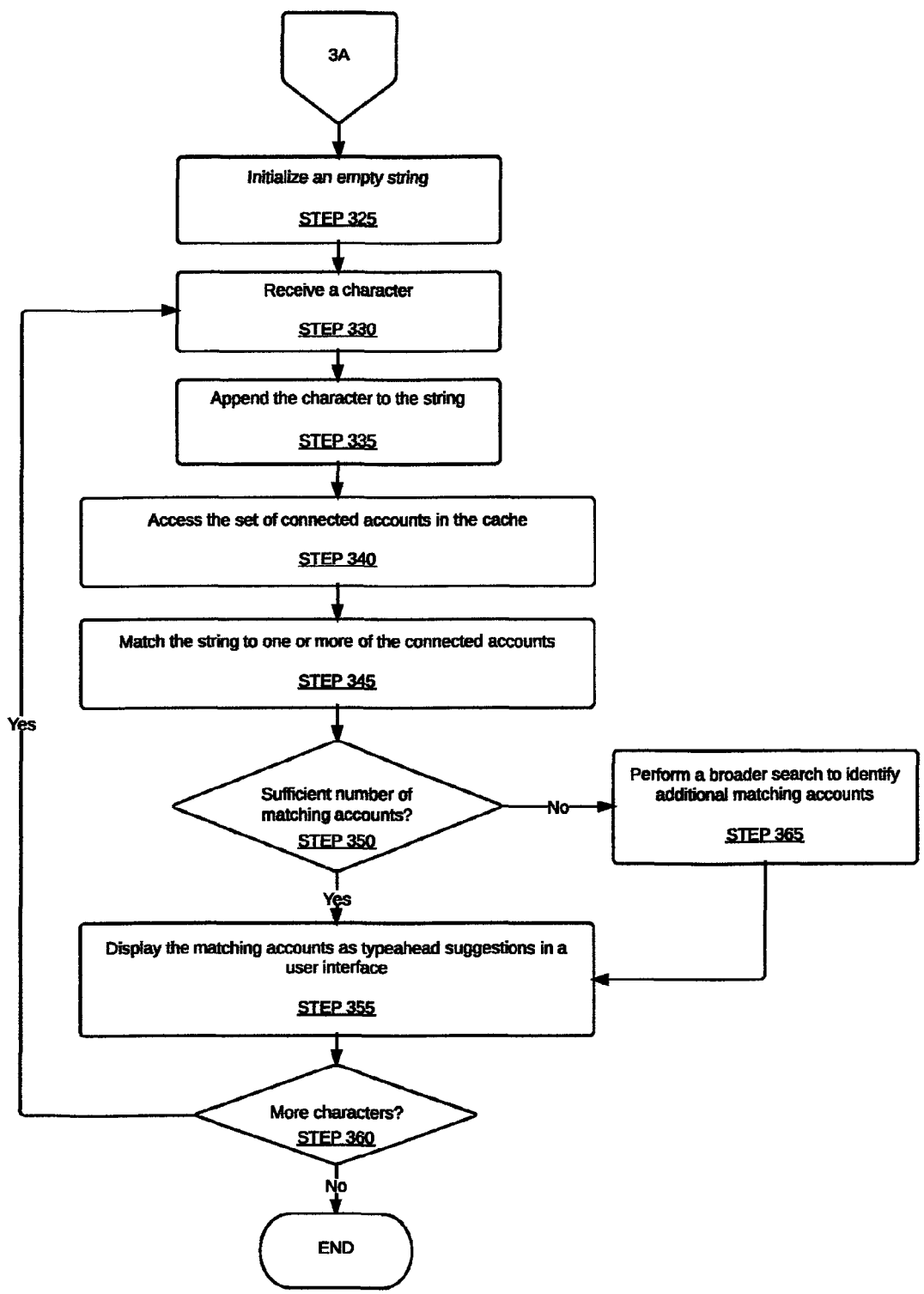
Figure 4B:
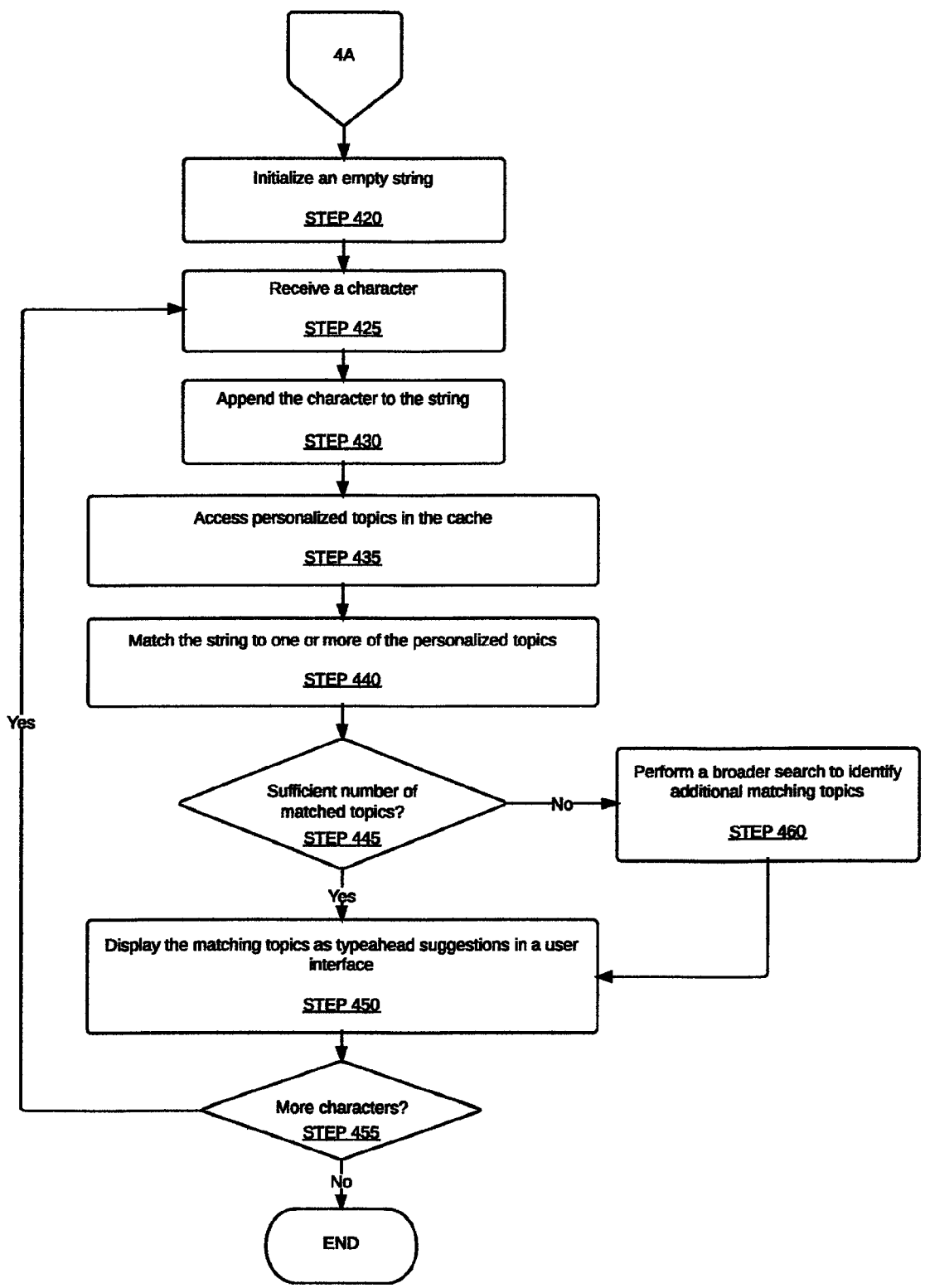
Figure 5:
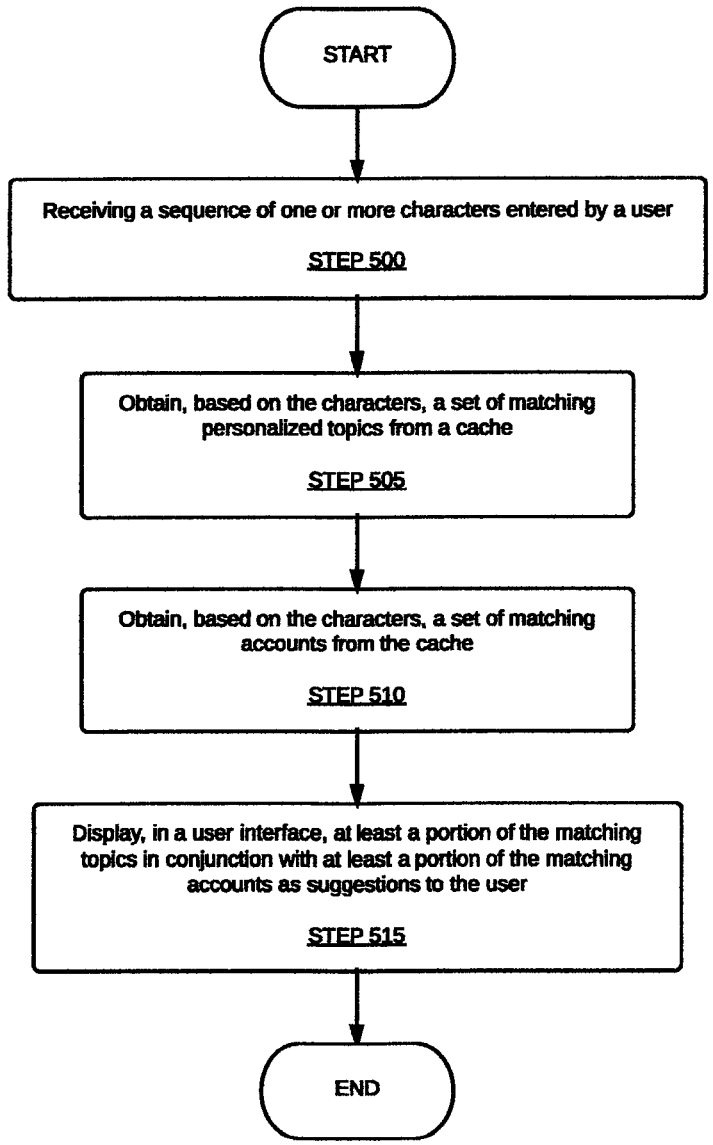

The steps of FIGS. 3B and 4B can be performed, for example, by a typeahead runtime engine (e.g., typeahead runtime engine (150) of FIG. 1, discussed above) in communication with a client computing device. The steps of FIG. 5 can be performed, for example, by a client application executing on a client computing device (e.g., client (105) of FIG. 1, discussed above). The steps of FIGS. 3B, 4B, and 5 can be performed to display typeahead suggestions in a user interface.

In one or more embodiments of the invention, one or more steps of the flowcharts are repeated concurrently by multiple threads. For example, STEPS 340-350 of FIG. 3B and STEPS 435-445 of FIG. 4B can be performed concurrently by multiple threads of a system. Thus, one or more of the steps can be performed serially, in parallel, and/or by a distributed system, in accordance with various embodiments of the invention.

Figure 6:
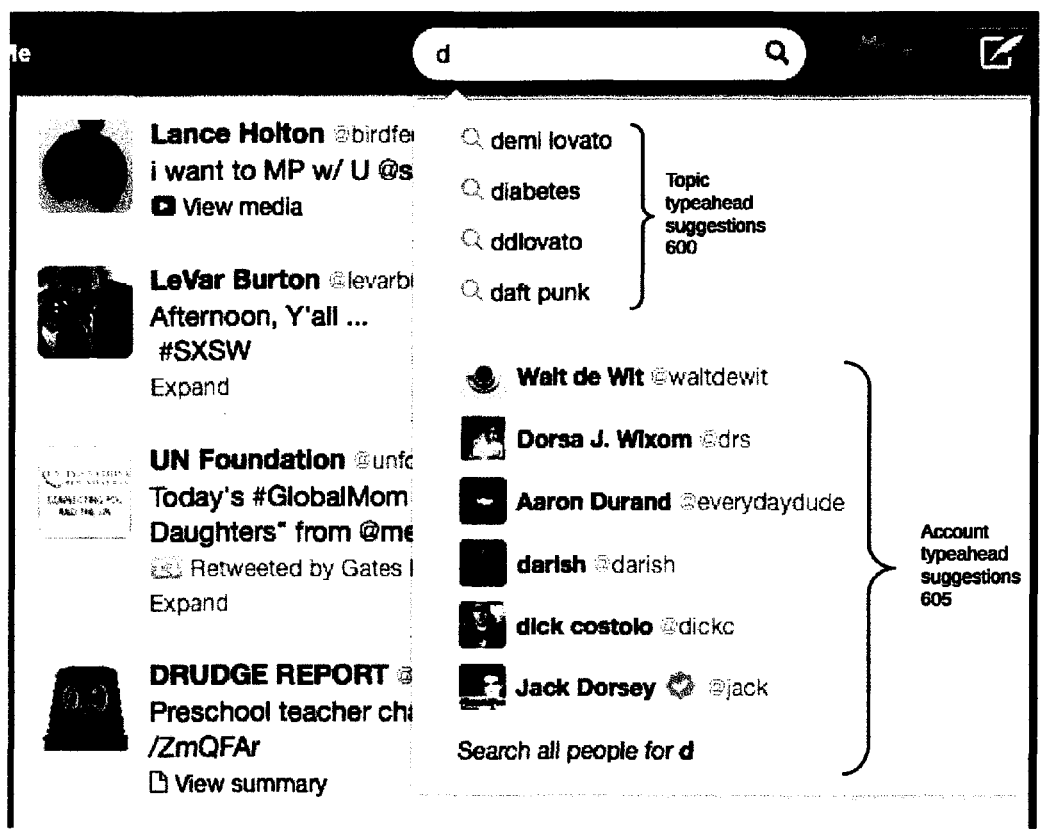
FIG. 6 shows an example of a user interface, in accordance with one or more embodiments of the invention.

FIG. 6 depicts an example user interface of a client application. The user interface includes a search box with user entered text (e.g., "d"), a set of topic typeahead suggestions (600), and a set of account typeahead suggestions (605). In this example, a user logged into an account of a messaging platform has entered the character "d" into the search box. The client application has searched a local cache including a set of personalized topics and connected accounts to generate typeahead suggestions and to display them in the user interface. The topic typeahead suggestions (600) of FIG. 6 can be generated using the system of FIG. 1 (discussed above) and/or the flowcharts of FIGS. 4A, 4B, and 5 (discussed above). Similarly, the account typeahead suggestions (605) of FIG. 6 can be generated using the system of FIG. 1 (discussed above) and/or the flowcharts of FIGS. 3A, 3B, and 5 (discussed above).

Figure 7:
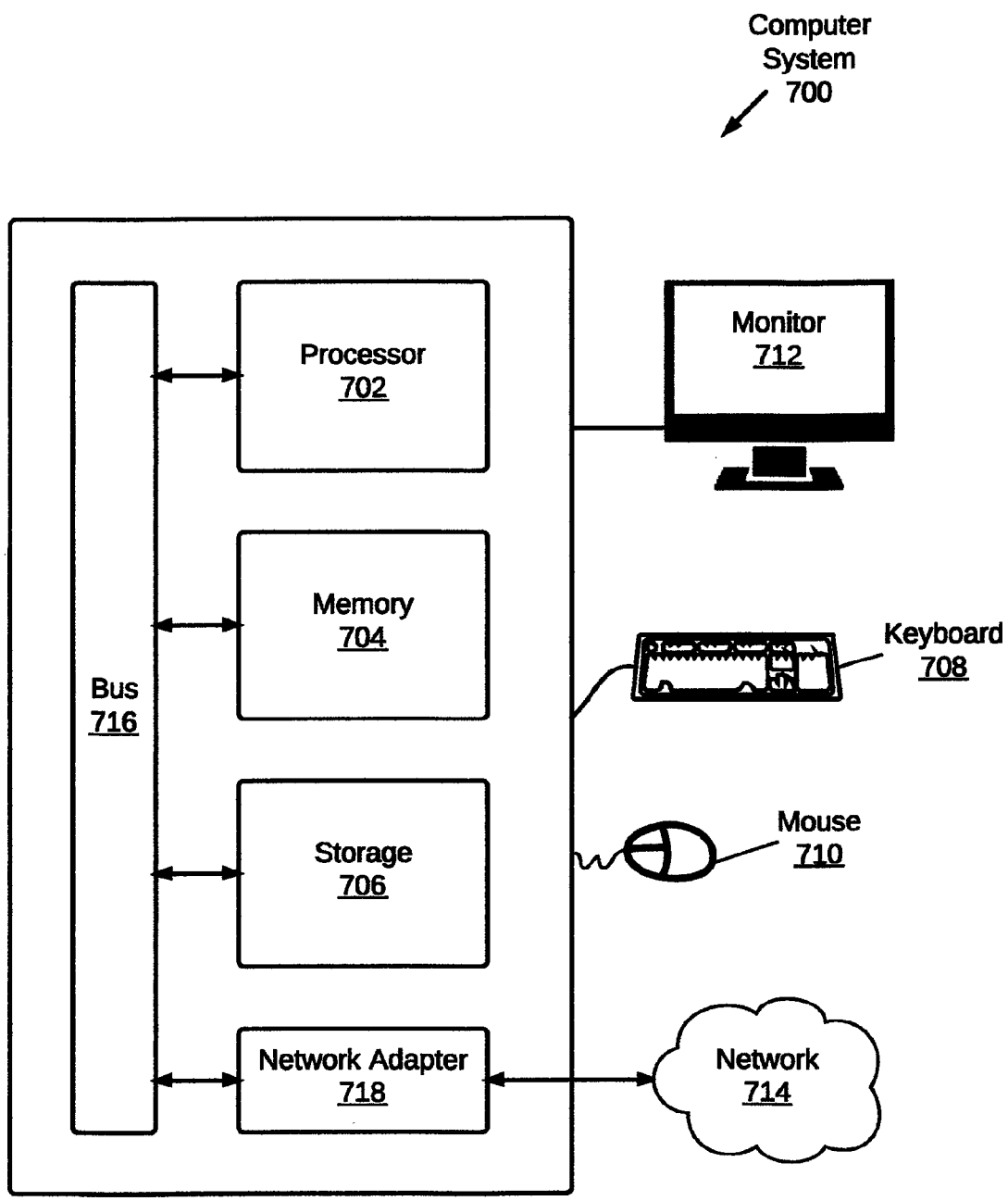
FIG. 7 shows a computer system, in accordance with one or more embodiments of the invention.

Embodiments of the invention may be implemented on a specialized computer system. For example, as shown in FIG. 7, a computer system (700) includes one or more processor(s) (702) (such as a central processing unit (CPU), integrated circuit, hardware processor, etc.), associated memory (704) (e.g., RAM, cache memory, flash memory, etc.), a storage device (706) (e.g., a hard disk, an optical drive such as a compact disk drive or digital video disk (DVD) drive, a flash memory stick, etc.), a network adapter (718), and numerous other elements and functionalities typical of today's computers (not shown). One or more components of the computer system (700) may be communicatively connected by a bus (716). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via the network adapter (718). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g., typeahead runtime engine (150), typeahead analysis module (145), typeahead repository (148), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Further, one or more elements of the above described systems (e.g., typeahead analysis module (145), typeahead runtime engine (150), typeahead repository (148), etc. of FIG. 1, discussed above) can be implemented as software instructions in the form of computer readable program code stored, temporarily or permanently, on one or more non-transitory computer readable storage media. The non-transitory computer readable storage media are executable by one or more computer processors to perform the functionality of one or more components of the above-described systems (e.g., FIG. 1) and/or flowcharts (e.g., FIGS. 3A, 3B, 4A, 4B, and 5), in accordance with various embodiments of the invention. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

One or more embodiments of the invention have one or more of the following advantages. By ranking connected accounts associated with a user account based on one or more signals, it may be possible to cache data associated with more relevant accounts for facilitating typeahead. These accounts can then be used to display more meaningful and relevant typeahead suggestions in response to user input.

In one or more embodiments, by ranking topics according to one or more graph-related signals associated with a user account, it may be possible to cache better personalized topics for facilitating typeahead. Thus, using connection graph data as a signal may result in more personalized and relevant topic suggestions in typeahead.

In one or more embodiments, by caching personalized topics and/or matching accounts in a client cache, it may be possible to reduce latency associated with typeahead requests.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for facilitating typeahead, the method comprising:
   identifying a user account of a messaging platform;
   identifying a predefined degree of separation value;
   identifying, by a computer processor at a client accessing the messaging platform, connected accounts within the predefined degree of separation value of the user account;
   selecting, by the computer processor, a subset of the connected accounts for inclusion in a cache stored on the client accessing the messaging platform, wherein selecting the subset of the connected accounts is based at least on a graph relationship signal of each of the subset of the connected accounts;
   receiving a first character entered by a user after the subset of the connected accounts are stored in the cache;
   accessing the subset of the connected accounts in the cache;

comparing the first character to the subset of the connected accounts to identify a plurality of matching accounts from the cache; and generating, at the client and using data from the cache, a plurality of typeahead suggestions based on the plurality of matching accounts and displaying the plurality of matching accounts as typeahead suggestions in a user interface of the client.

2. The method of claim 1, further comprising:
receiving a second character entered by the user;
determining that a string comprising the first character followed by the second character does not match any of the subset of the connected accounts;
performing a broader search for matching accounts using a broader graph relationship signal;
identifying a broader set of connected accounts based on the broader search;
comparing the string to the broader set of connected accounts to identify a new plurality of matching accounts; and
displaying the new plurality of matching accounts as typeahead suggestions in the user interface of the client.

3. The method of claim 2, wherein the cache is stored on the client and the client includes a mobile device of the user, and wherein the first character and the second character are entered into a user interface of the mobile device by the user.

4. The method of claim 2, further comprising:
transmitting a request to a server, the request corresponding to performing a broader search for matching accounts using a broader graph relationship signal;
receiving a broader set of connected accounts based on the broader search;
comparing the string to the broader set of connected accounts to identify a new plurality of matching accounts; and
displaying the new plurality of matching accounts as typeahead suggestions in the user interface of the client.

5. The method of claim 2, wherein identifying a broader set of connected accounts includes using a plurality of signals that are independent of the graph relationships associated with the user account.

6. The method of claim 1, wherein the graph relationship signal is one selected from a group consisting of number of direct graph connections, number of common connections with the user account, number of interactions with the user account, a calculated credibility value, connection velocity depicting a rate at which graph connections are made, common interest values with the user account, a trending account signal, location proximity to an originating device, language and a promoted account signal.

7. The method of claim 1, wherein selecting the subset of the connected accounts comprises:
calculating a score for each of the connected accounts using a predefined scoring algorithm, wherein the predefined scoring algorithm uses the graph relationship signal and a credibility signal as inputs; and
selecting a highest scoring subset of the connected accounts for inclusion in the subset.

8. The method of claim 1, further comprising receiving, from the messaging platform, data for the cache, the data including, a plurality of records, each including a name, a numerical identifier, a username, and a token set.

9. The method of claim 1, wherein at least one update to the cache is performed by the messaging platform and provided to the client, in response to receiving a user request to update the cache.

10. A method for facilitating typeahead, the method comprising:
receiving, by a computer processor, a character entered by a user in a user interface hosted by a messaging platform;
obtaining, by the computer processor and based on the character, a set of matching personalized topics from a cache stored on a client accessing the messaging platform;
obtaining, by the computer processor and based on the character, a set of matching accounts from the cache; and
displaying, by the computer processor and in the user interface, at least a portion of the set of matching personalized topics in conjunction with at least a portion of the set of matching accounts as typeahead suggestions;
wherein the cache includes a plurality of personalized topics and accounts selected based at least in part on a graph relationship signal of each of the plurality of accounts connected to the user.

11. The method of claim 10, wherein the portion of the set of matching personalized topics is displayed in a first contiguous list of the user interface and wherein the portion of the set of matching topics is displayed in a second contiguous list of the user interface.

12. The method of claim 10, further comprising:
calculating a score for each of a set of trending topics using a first scoring algorithm;
designating a highest scoring subset of the set of trending topics as matching personalized topics;
calculating a score for each of a set of connected accounts using a second scoring algorithm, wherein each of the set of connected accounts has a graph relationship with a user account of the user;
designating a highest scoring subset of the set of connected accounts as matching accounts; and
generating, from the highest scoring subset of the set of trending topics and the highest scoring subset of the set of connected accounts, an ordered list comprising the portion of the matching personalized topics and the portion of the matching accounts, wherein the ordered list is used to present typeahead suggestions in a specified order to the user.

13. The method of claim 10, wherein the cache is configured to store data associated with a plurality of personalized topics and a plurality of accounts, each associated with the user, the data selected for storage based at least in part on a ranking determined using a plurality of text attributes and identifiers associated with the plurality of personalized topics and the plurality of accounts.

14. The method of claim 10, wherein the computer processor is further configured to:
designate, based on at least one signal associated with the user, a subset of trending topics as personalized topics; and
display, by the computer processor and in the user interface, the designated personalized topics in conjunction with at least a portion of the set of matching accounts as typeahead suggestions.

15. The method of claim 10, wherein the computer processor is further configured to:

identify at least one matching topic without receiving the character entered by the user; and display, by the computer processor and in the user interface, the at least one matching topic in conjunction with at least a portion of the set of matching accounts as typeahead suggestions.

16. A client system for facilitating typeahead, comprising:

a display screen;

a computer processor; and a client typeahead module executing on the computer processor and configured to:

receive a character entered by a user in a user interface hosted by a messaging platform;

obtain, based on the character, a set of matching personalized topics from a cache stored on a client accessing the messaging platform;

obtain, based on the character, a set of matching accounts from the cache; and display, in the user interface, at least a portion of the set of matching personalized topics in conjunction with at least a portion of the set of matching accounts as typeahead suggestions;

wherein the cache includes a plurality of personalized topics and accounts selected based at least in part on at least one conversation graph associated with each of the plurality of accounts connected to the user.

17. The system of claim 16, wherein the portion of the set of matching personalized topics is displayed in a first contiguous list of the user interface and wherein the portion of the set of matching topics is displayed in a second contiguous list of the user interface.

18. The system of claim 16, wherein the cache is configured to store data associated with a plurality of personalized topics and a plurality of accounts, each associated with the user, the data selected for storage based at least in part on a ranking determined using a plurality of text attributes and identifiers associated with the plurality of personalized topics and the plurality of accounts.

19. The system of claim 16, wherein the computer processor is further configured to:

designate, based on at least one signal associated with the user, a subset of trending topics as personalized topics; and display, by the computer processor and in the user interface, the designated personalized topics in conjunction with at least a portion of the set of matching accounts as typeahead suggestions.

20. The system of claim 16, wherein the computer processor is further configured to:

identify at least one matching topic without receiving the character entered by the user; and display, by the computer processor and in the user interface, the at least one matching topic in conjunction with at least a portion of the set of matching accounts as typeahead suggestions.

* * * * *